US012284483B2

(12) United States Patent
Zou et al.

(10) Patent No.: US 12,284,483 B2
(45) Date of Patent: Apr. 22, 2025

(54) CAPACITIVE MEMS MICROPHONE, MICROPHONE UNIT AND ELECTRONIC DEVICE

(71) Applicant: GOERTEKMICROELECTRONICS CO. LTD., Qingdao (CN)

(72) Inventors: Quanbo Zou, Shandong (CN); Maoqiang Dang, Shandong (CN); Dexin Wang, Shandong (CN)

(73) Assignee: GoertekMicroelectronics Co. Ltd., Shandong (CN)

( * ) Notice: Subject to any disclaimer, the term of this patent is extended or adjusted under 35 U.S.C. 154(b) by 206 days.

(21) Appl. No.: 18/010,870

(22) PCT Filed: Jun. 30, 2020

(86) PCT No.: PCT/CN2020/099407

§ 371 (c)(1),
(2) Date: Dec. 16, 2022

(87) PCT Pub. No.: WO2021/253498

PCT Pub. Date: Dec. 23, 2021

(65) Prior Publication Data

US 2023/0224646 A1 Jul. 13, 2023

(30) Foreign Application Priority Data

Jun. 16, 2020 (CN) ......................... 202010547963.9

(51) Int. Cl.
*H04R 19/04* (2006.01)
*H04R 1/02* (2006.01)
*H04R 1/04* (2006.01)
*H04R 1/24* (2006.01)
(Continued)

(52) U.S. Cl.
CPC ............. *H04R 19/04* (2013.01); *H04R 1/028* (2013.01); *H04R 1/04* (2013.01); *H04R 1/245* (2013.01); *H04R 7/06* (2013.01); *H04R 3/00* (2013.01); *H04R 2201/003* (2013.01); *H04R 2499/11* (2013.01)

(58) Field of Classification Search
None
See application file for complete search history.

(56) References Cited

U.S. PATENT DOCUMENTS

2011/0317857 A1 12/2011 Christensen et al.
2014/0270271 A1* 9/2014 Dehe ...................... H04R 23/00
381/174

(Continued)

FOREIGN PATENT DOCUMENTS

CN 104883651 A 9/2015
CN 105492373 A 4/2016
CN 110351641 A 10/2019

*Primary Examiner* — James K Mooney
(74) *Attorney, Agent, or Firm* — Baker Botts LLP

(57) ABSTRACT

Disclosed in embodiments of the present disclosure are a capacitive MEMS microphone, a microphone unit and an electronic device. The capacitive MEMS microphone includes: a back electrode plate; a diaphragm; and a spacer for separating the back electrode plate from the diaphragm, wherein in a state where an operating bias is applied, a ratio of a static effective displacement of the diaphragm relative to a flat position to a thickness of the diaphragm is greater than or equal to 0.5.

10 Claims, 4 Drawing Sheets

(51) Int. Cl.
*H04R 7/06* (2006.01)
*H04R 3/00* (2006.01)

(56) References Cited

U.S. PATENT DOCUMENTS

| | | | | |
|---|---|---|---|---|
| 2015/0109889 | A1* | 4/2015 | Chen | H04R 7/06 367/189 |
| 2015/0245146 | A1* | 8/2015 | Liu | B81B 3/0051 257/416 |
| 2016/0340173 | A1* | 11/2016 | Klein | B81B 3/007 |
| 2019/0210866 | A1* | 7/2019 | Chen | B81B 3/0072 |
| 2020/0216309 | A1* | 7/2020 | Fueldner | B81B 3/0021 |
| 2020/0389723 | A1* | 12/2020 | Johnson | H04R 1/04 |
| 2021/0076141 | A1* | 3/2021 | Lee | H04R 19/005 |

* cited by examiner

CAPACITIVE MEMS MICROPHONE, MICROPHONE UNIT AND ELECTRONIC DEVICE

CROSS-REFERENCE TO RELATED APPLICATIONS

This application is a National Stage of International Application No. PCT/CN2020/099407, filed on Jun. 30, 2020, which claims priority to Chinese Patent Application No. 202010547963.9, filed on Jun. 16, 2020, both of which are hereby incorporated by reference in their entireties.

TECHNICAL FIELD

The present disclosure relates to the field of a capacitive MEMS (micro-electro-mechanical system) microphone, and in particular to a capacitive MEMS microphone, a microphone unit and an electronic device.

BACKGROUND

An MEMS (micro-electro-mechanical system) microphone is a microphone chip manufactured with MEMS technology, which is small in size and can be widely used for various electronic devices, such as mobile phones, tablets, monitoring devices, wearable devices, etc.

A capacitive MEMS microphone is in a dual-ends capacitor structure. FIG. 1 shows the structure of a capacitive MEMS microphone. As shown in FIG. 1, the capacitive MEMS microphone includes a back electrode plate 11, a diaphragm 12, and a spacer 13 located between the back electrode plate 11 and the diaphragm 12. The spacer 13 is used for separating the back electrode plate 11 from the diaphragm 12. The spacer 13 may be a separate spacing layer, or a part of the chip substrate.

In FIG. 1, the back electrode plate 11, the diaphragm 12 and the spacer 13 enclose a rear cavity 15 of the capacitive MEMS microphone. A hole 14 in communication with the rear cavity 15 may be formed in the back electrode plate 11. A vent hole (not shown) may also be formed in the diaphragm 12.

As shown in FIG. 2, under an operating bias, the diaphragm 12 bends toward the back electrode plate 11. In order to ensure the mechanical linear performance of the diaphragm 12, under a condition that the operating bias is applied, the diaphragm 12 has a low static deflection when it is in a stationary state, that is, the ratio of a static effective displacement (static effective deflection) of the diaphragm 12 relative to a flat position to the thickness of the diaphragm 12 is $W_0/t$ which is less than 0.5, wherein $W_0$ is the effective displacement of the diaphragm 12 in the stationary state under the operating bias, and t is the thickness of the diaphragm 12.

The diaphragm 12 of FIG. 2 is configured to have great stiffness so that the diaphragm 12 has low static deflection. This diaphragm is less sensitive.

Therefore, there is a need to provide a new capacitive MEMS microphone.

SUMMARY

Embodiments of the present disclosure provides a new technical solution of a capacitive MEMS microphone.

According to a first aspect of the present disclosure, a capacitive MEMS microphone is provided, including: a back electrode plate; a diaphragm; and a spacer for separating the back electrode plate from the diaphragm, wherein in a state where an operating bias is applied, a ratio of a static effective displacement of the diaphragm relative to a flat position to a thickness of the diaphragm is greater than or equal to 0.5.

According to a second aspect of the present disclosure, a microphone unit is provided, including a unit shell, a capacitive MEMS microphone disclosed herein and an integrated circuit chip, wherein the capacitive MEMS microphone and the integrated circuit chip are provided in the unit shell.

According to a third aspect of the present disclosure, an electronic device is disclosed, including a microphone unit disclosed herein.

In various embodiments, it is possible to reduce the overall non-linearity of the microphone by using a diaphragm with a great static deflection.

It should be understood that the above general description and the following detailed description are only exemplary and explanatory, and are not intended to limit the embodiments of the present specification.

In addition, there is no need for any one of the embodiments of the present disclosure to achieve all the above-mentioned effects.

Other features and advantages of the present disclosure will become apparent from the following detailed description of exemplary embodiments of the present disclosure with reference to the accompanying drawings.

BRIEF DESCRIPTION OF THE DRAWINGS

In order to more clearly explain the embodiments of the present disclosure or the technical solutions in the prior art, the drawings required in the description of the embodiments or the prior art will be briefly described below. It will be apparent that the drawings in the following description are only some of the embodiments described in the embodiments of the present disclosure, and other drawings can be obtained by those skilled in the art according to these drawings.

DETAILED DESCRIPTION

Figure 1:
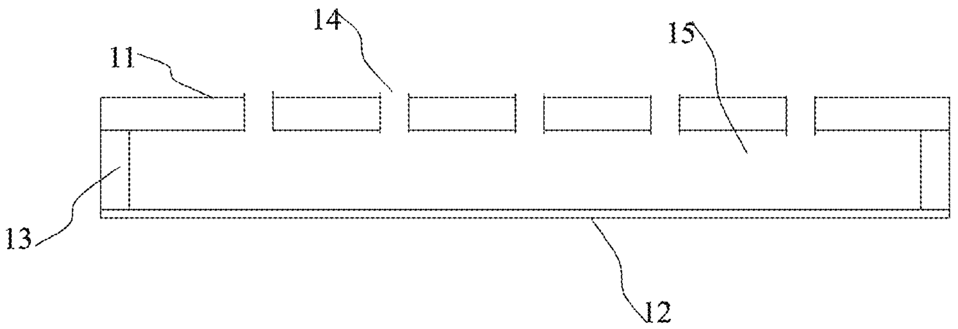
FIG. 1 shows a schematic diagram of a micro-electro-mechanical microphone of the prior art.
Figure 2:
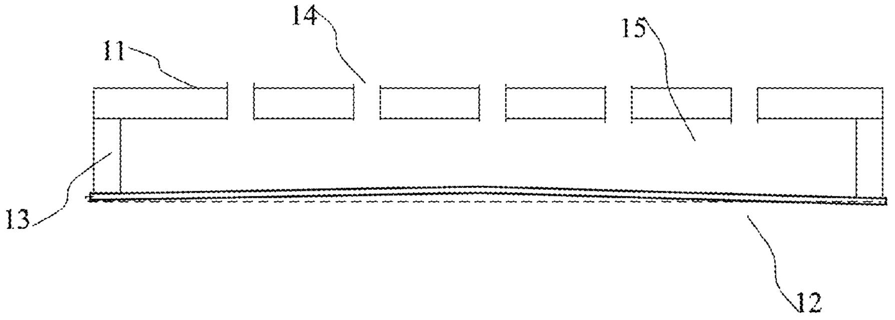
FIG. 2 shows the schematic diagram of the micro-electro-mechanical microphone of the prior art, wherein the diaphragm has a low static deflection in a state where the operating bias is applied.

Various exemplary embodiments of the present disclosure will now be described in detail with reference to the accompanying drawings.

The following description of at least one exemplary embodiment is in fact merely illustrative and is in no way intended to constitute any limitation to the present disclosure and its application or use.

It should be noted that similar reference numerals and letters denote similar items in the accompanying drawings, and therefore, once an item is defined in a drawing, and there is no need for further discussion in the subsequent accompanying drawings.

In the following, different embodiments and examples of the present disclosure are described with reference to the accompanying drawings.

Figure 5:
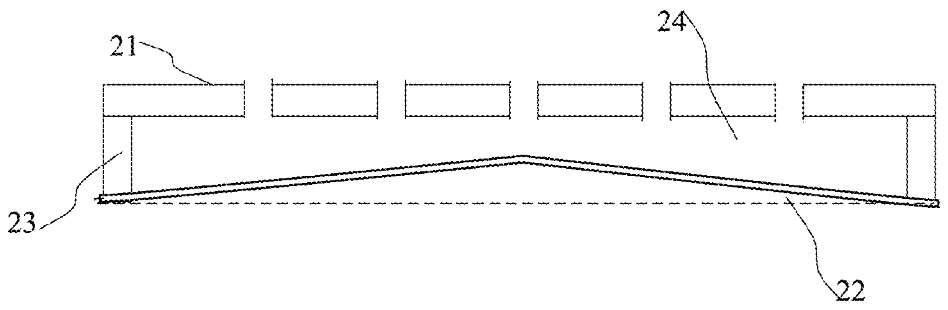
FIG. 5 shows a schematic diagram of a capacitive MEMS microphone according to one embodiment disclosed herein.

Here, a capacitive MEMS (micro-electro-mechanical system) microphone is provided. For example, as shown in FIG. 5, the capacitive MEMS microphone includes a back electrode plate 21, a diaphragm 22 and a spacer 23. The spacer 23 is used to separate the back electrode plate 21 from the diaphragm 22. The spacer 23 may be a separate spacing layer, or a part of the chip substrate.

In a state where an operating bias is applied, a ratio of a static effective displacement of the diaphragm 22 relative to a flat position to a thickness of the diaphragm is greater than or equal to 0.5. As shown in FIG. 5, the diaphragm 22 deviates from a large distance relative to the flat position shown in dashed lines.

In FIG. 5, the back electrode plate 21, the diaphragm 22 and the spacer 23 form a rear cavity 24.

In the following, the working principle and performance of the capacitive MEMS microphone including the back electrode plate 21 and diaphragm 22 shown in FIG. 5 will be explained in conjunction with FIGS. 3 and 4. This capacitive MEMS microphone may also be called a dual-end capacitive MEMS microphone. In a capacitive MEMS microphone, the total amount of charge is constant (fixed), that is, at audio frequencies, the amount of charge Q=CV is constant, wherein C and V are respectively the capacitance and voltage between a diaphragm and a back electrode plate. Therefore, the signal output may be expressed as:

$$vo=-x/(1-x)\cdot VB \quad \text{(formula 1)}$$

Here $x=w/G_0$, which is the ratio of the displacement w of the diaphragm 22 to the static air gap $G_0$ between the back electrode plate 21 and the diaphragm 22, and VB is the operating bias between the back electrode plate 21 and the diaphragm 22. The static air gap $G_0$ is the effective static air gap between the diaphragm with the operating bias VB applied, and the back electrode plate. VB may represent a bias voltage that enables the diaphragm to be in a desired operating state.

When the output signal is obtained with the capacitance detection between the back electrode plate and the diaphragm, the non-linearity generated by the capacitance detection may be expressed as:

$$|vo^+/vo^-|=[(1-x^-)/(1-x^+)]\cdot(x^+/x^-) \quad \text{(formula 2)}$$

Here, the meanings of vo and x in formula 2 are as above, and the superscripts + and − correspond to the positive and negative half periods of the sound pressure accepted by the diaphragm, respectively. When the sound pressure is positive, x changes toward the direction in which the air gap G decreases. Formula 2 shows one of the main sources of non-linearity in dual-end capacitive MEMS microphones.

A traditional microphone utilizes the mechanical linearity of the diaphragm, that is, tries to make the displacement w of the diaphragm proportional to the sound pressure p, i.e., $x^-=-x^+$, $x^+=x>0$, wherein for x, the direction towards which the air gap G decreases is positive. At this point, the non-linearity of the microphone may be expressed as:

$$|vo^+/vo^-|=(1+x)/(1-x) \quad \text{(formula 3)}$$

In formula 3, the positive signal output is greater than the negative signal output, and the degree of non-linearity of the microphone is directly related to x.

In addition, the non-linearity of the microphone itself may be expressed as:

$$P=aW+bW^3 \quad \text{(formula 4)}$$

Here, P and W are the total pressure and total displacement received by the diaphragm, and a and b are positive constants.

$W_0$ is the static effective displacement (an effective displacement under the operating bias) of the diaphragm in the static state (that is, a state in which the operating bias VB is applied but the sound pressure p is not applied). Since the operating bias VB is applied between the diaphragm and the back electrode plate of the capacitive microphone, $W_0>0$. When a sound pressure p is applied to the diaphragm, the displacement of diaphragm is $w^+$ in the positive half cycle of the sound pressure p (positive sound pressure), and is $w^-$ in the negative half cycle of the sound pressure p (negative sound pressure), and $w^+$ is slightly lower than $w^-$.

Formula 4 may also be expressed as:

$$p+P_0=a(W_0+w)+b(W_0+w)3 \quad \text{(formula 5)}$$

Here, p is the sound pressure (with positive and negative half cycles), P0>0 is the static pressure generated by the electrostatic force, and w is an additional displacement of the diaphragm generated by the sound pressure (can be a positive or negative value).

Figure 3:
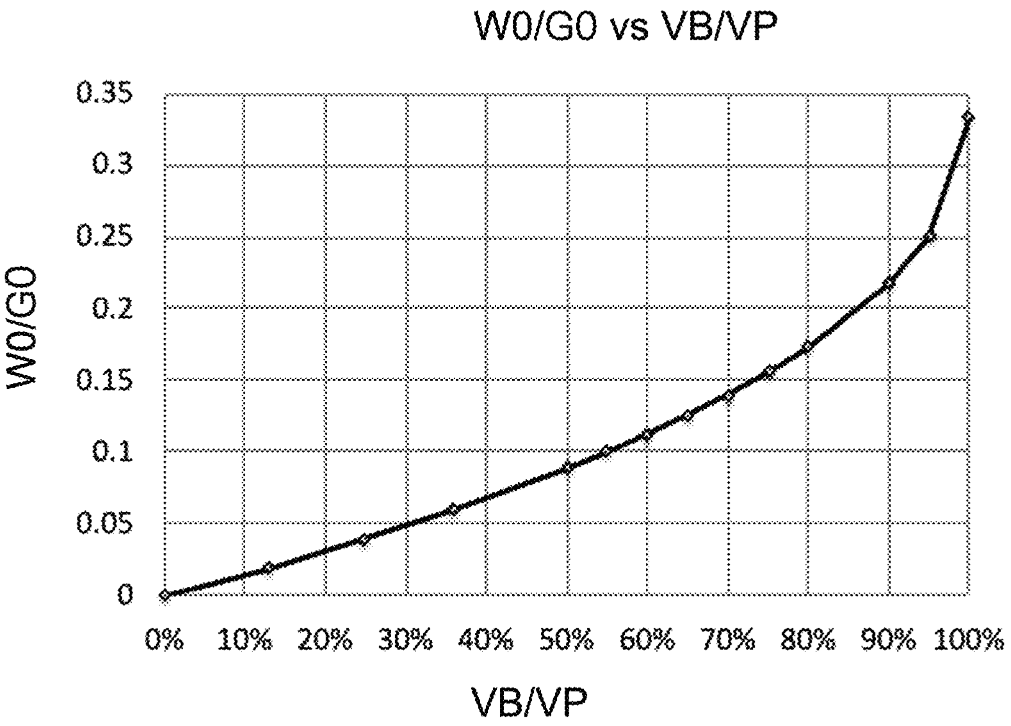
FIG. 3 shows a graph of the effective displacement of the diaphragm in a static state versus an operating bias.

FIG. 3 shows the relationship between the static effective displacement $W_0$ and the operating bias VB. In FIG. 3, the abscissa is VB/VP, wherein VP indicates the breakdown voltage of the microphone, and the ordinate is $W_0/G_0$. In order to ensure the reliability of microphone devices, VB/VP<75% is usually set, and the corresponding $W_0/G_0$ is about 16%. By setting VB, it is possible to adjust the static deflection of the diaphragm 22, or adjust the ratio $W_0/t$ of the static effective displacement $W_0$ of the diaphragm 22 relative to the flat position to the thickness t of the diaphragm.

In a traditional capacitive MEMS microphone, in order to pursue mechanical linearity, it is necessary to select a diaphragm which has a low static deflection at a static state (no sound pressure is applied), or the ratio $W_0/t$ of the static effective displacement $W_0$ of the diaphragm 22 relative to the flat position to the thickness t of the diaphragm is equal to or lower than 0.5. The non-linearity of this microphone mainly comes from capacitance detection.

Here, it is proposed to counteract the non-linearity of the capacitance detection by increasing the static deflection of the diaphragm.

Specifically, considering the above formulas 1-5, the overall non-linearity of the capacitive MEMS microphone may be expressed as:

$$|vo^+/vo^-=A+B \quad \text{(formula 6)}$$

Here, $A=(1-x-)/(1-x+)\sim(1+x)/(1-x)>1$, $$B=(x^+/x^-)=[a+3b(W_0+w^-)2]/[a\pm 3b(W_0+w^+)^2]$$

$$\sim[a+3b(W_0-w)]/[a+3b(W_0+w)]<1,\text{ wherein } w^+=w\sim -w->0$$

If the non-linearity of the capacitive MEMS microphone is considered comprehensively, it can be found in formula 6 that A is larger than 1 and B is lower than 1. Therefore, by adjusting A or B, it is possible to reduce the non-linearity caused by the asymmetry of the positive and negative cycles of the signal output, thereby improving THD (Total Harmonic Distortion) and AOP (Acoustic Overload Point).

In the present disclosure, with the operating bias VB, it is possible to adjust "pre-deviation amount" (static deflection of the diaphragm) such that $W_0/t$ 0.5, preferably $W_0/t \geq 1$. This pre-deviation allows A in Formula 6 to be at least partially neutralized by B, thereby improving the degree of non-linearity of the output signal or the sound pressure level at a certain degree of non-linearity. For example, it is possible to significantly improve a sound pressure level of THD of 1% or AOP at THD of 10%.

Figure 4:
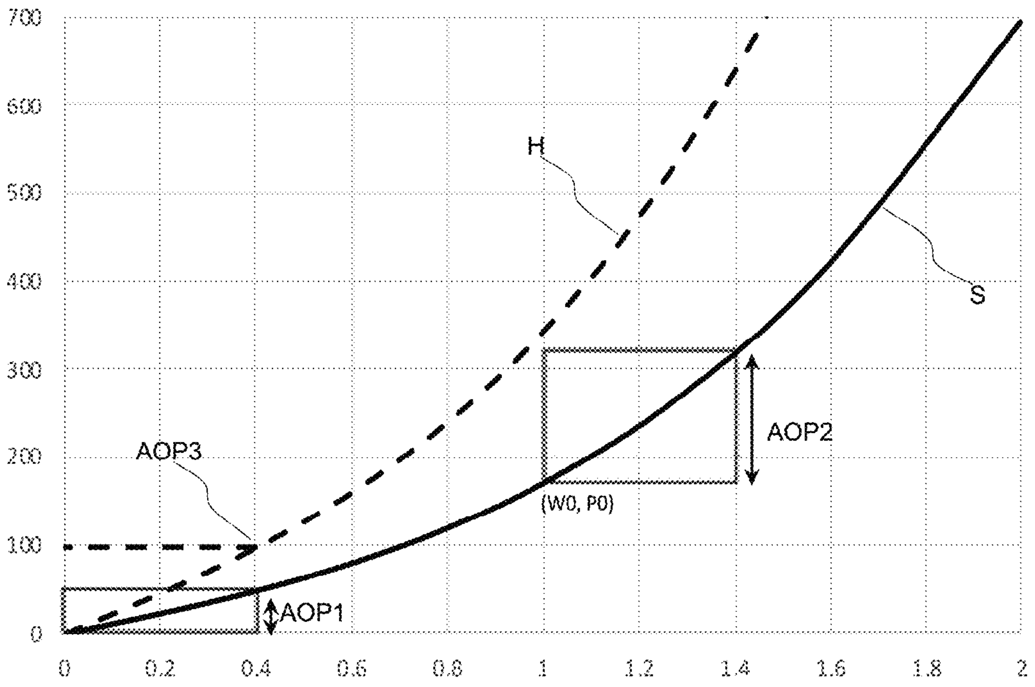
FIG. 4 shows a schematic diagram of the acoustic overload point of the diaphragm.

FIG. 4 shows the relationship between pre-deviation amount and AOP. In FIG. 4, the abscissa indicates the ratio $W_0/t$ of the static deflection of the diaphragm to the thickness of the diaphragm, and the ordinate indicates the static pressure $P_0$. In FIG. 4, the solid line indicates properties of a soft diaphragm S, and the dashed line indicates properties of a hard diaphragm H. As shown in FIG. 4, the diaphragm S has a low AOP1 when the initial static deflection of diaphragm S is low. If the hard diaphragm H is used, the diaphragm H has a low AOP3 at a low static deflection. The hard diaphragm H, however, may have a reduced sensitivity. When the static deflection of the diaphragm S is set large, for example, when the static deflection of the diaphragm S is set at a point corresponding to ($W_0$, $P_0$), AOP2 of the diaphragm S is significantly increased relative to AOP1. In this way, it is possible to improve performances such as AOP while retaining the advantages (e.g., sensitivity) of the soft diaphragm.

In the state where the operating bias is not applied, the diaphragm 22 is in a flat state, that is, the diaphragm 22 has no displacement/warping/deflection. For example, the air gap G is equal to 5-10 μm and the thickness t of the diaphragm 22 is 0.1-1 μm. In the state where the operational bias is applied, the effective (average) displacement $W_0$ of the diaphragm 22 is (0.5-3) t, or the maximum displacement We (at the center) of the diaphragm is (1-9) t, which is beyond the low static deflection range of a conventional capacitive MEMS microphone. The mechanical non-linearity of the diaphragm 22 is of the same magnitude, but opposite direction, as the non-linearity of the capacitance detection, thereby greatly reducing the overall non-linearity of the MEMS microphone and improving performances such as THD and AOP.

Here, the free diaphragm is pre-deviated to a great deflection by electrostatic action. In this way, it is possible to artificially introduce the mechanical (geometric) non-linearity of diaphragm, that is, the asymmetry of the mechanical response of sound pressure in the positive and negative half cycles. The deformation of the diaphragm is $w^+$ when a positive sound pressure is applied (being pressed towards the back electrode plate), and is $w^-$ when a negative sound pressure is applied (away from the back electrode plate), and w+ is lower than w−. This can compensate for the non-linearity introduced by the capacitance detection, that is, the output signal may be expressed as:

$v_{out} \sim -x/(1-x)VB$, wherein $x=w/G_0$, w is the displacement of the diaphragm caused by the sound pressure, $G_0$ is the effective static air gap when the operating bias is applied and the sound pressure is not applied, and VB is operating bias. Under a positive sound pressure, x>0, and the output signal is greater than x*VB; and under a negative sound pressure, the output signal is lower than x*VB. Considering $w+/w- \sim(1-x)/(1+x)$ at a specific sound pressure level, it is possible to use the mechanical non-linearity of the diaphragm to compensate for the non-linearity caused by the capacitance detection, thereby improving the THD and AOP of a capacitive MEMS microphone.

Figure 6:
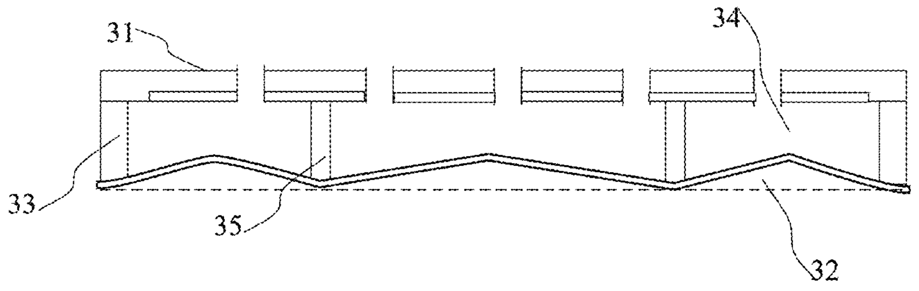
FIG. 6 shows a schematic diagram of the capacitive MEMS microphone according to another embodiment disclosed herein.

FIG. 6 shows a schematic diagram of the capacitive MEMS microphone according to another embodiment disclosed herein.

As shown in FIG. 3, if VB/VP=75% is taken as the upper limit of the operating bias (i.e., $W_0/G_0 \sim 16\%$), when the ratio $W_0/t$ of a great static deflection to the diaphragm is 0.5, 1, and 1.5, respectively, the corresponding $G_0/t$ is 3.1, 6.3, and 9.4, respectively.

When the air gap $G_0$ exceeds 5-10 μm, a diaphragm with a large area is generally required to form a sufficient effective capacitance $C_{mic}$ so as to ensure performances of the microphone. Taking $G_0$=5 μm as an example, the corresponding diaphragm thickness t is 1.6 μm, 0.8 μm and 0.53 μm respectively.

Therefore, the design of a great static deflection requires a thin diaphragm. Since such a diaphragm is too soft and its resonant frequency is too low, it is not easy to form a free diaphragm that is single and large. FIG. 6 proposes to connect a plurality of small diaphragms in parallel to form a diaphragm array with a large area.

In FIG. 6, the spacer of the capacitive MEMS microphone includes a first spacer 33 and a second spacer 35. The first spacer 33 is disposed along periphery of the diaphragm. In the capacitive MEMS microphone of FIG. 6, the back electrode plate 31, the diaphragm 32 and the first spacer 33 form a rear cavity 34. The second spacer 35 is disposed within a projection range of the diaphragm 32 toward the back electrode plate 31 and separates the diaphragm 32 into at least two vibrating portions. For example, in FIG. 6, the diaphragm is separated into three vibrating portions. The above vibrating portions are used as diaphragm units to form a diaphragm array.

In one example, at least two of the diaphragm units have different sound response characteristics. In this way, it is possible to adjust the response characteristics of the MEMS microphone in different aspects (for example in different frequency bands) respectively.

As shown in FIG. 6, the second spacer 35 is a columnar body located between the diaphragm and the back electrode plate. With the columnar body, it is possible to reduce the influence of the spacer 35 on the MEMS microphone, for example to reduce the parasitic capacitance.

Figure 7:
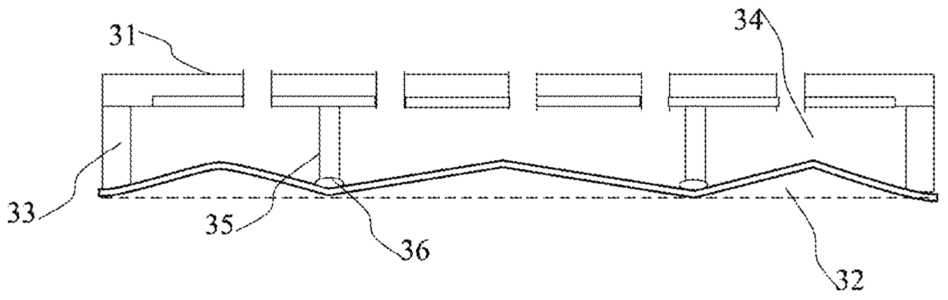
FIG. 7 shows a schematic diagram of the capacitive MEMS microphone according to yet another embodiment disclosed herein.

FIG. 7 shows a schematic diagram of the capacitive MEMS microphone according to yet another embodiment disclosed herein.

The capacitive MEMS microphone in FIG. 7 differs from the capacitive MEMS microphone in FIG. 6 in an end 36 of the columnar body 35 in contact with the diaphragm 32. As shown in FIG. 7, a sectional area of the columnar body 35 at an end 36 thereof in contact with the diaphragm 32 is larger than that of the columnar body 35 at the middle thereof. In this way, it is possible to prevent the end 36 of the columnar body 35 from damaging the diaphragm 32.

In addition, the end 36 may include an elastic portion. The elastic portion has elasticity greater than that of the main portion of the columnar body. In this way, it is possible to further prevent the end 36 of the columnar body 35 from damaging the diaphragm 32.

Figure 8:
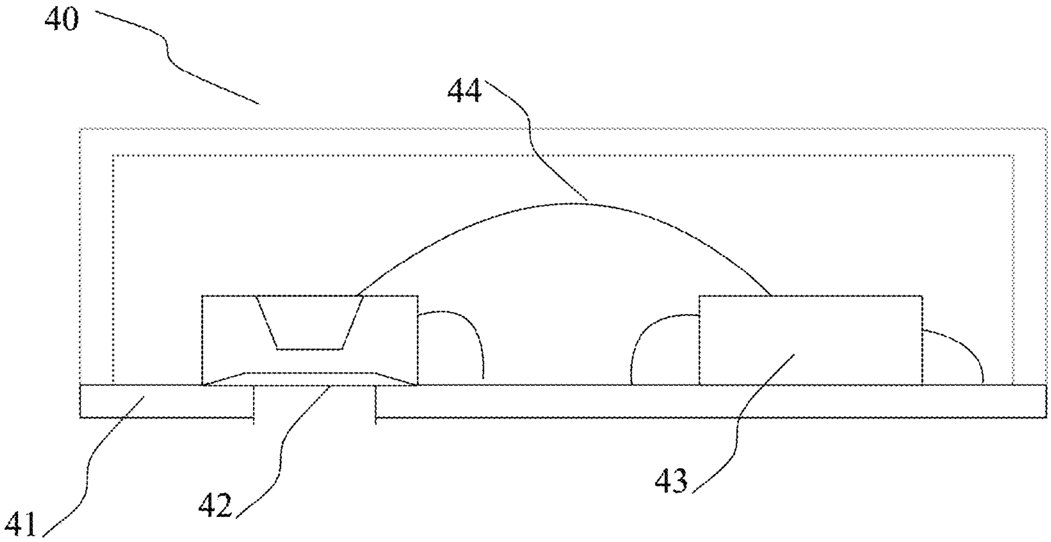
FIG. 8 shows a schematic diagram of a microphone unit according to one embodiment disclosed herein.

FIG. 8 shows a schematic diagram of a microphone unit according to one embodiment disclosed herein.

As shown in FIG. 8, the microphone unit 40 includes a unit shell 41, the capacitive MEMS microphone 42 described above, and an integrated circuit chip 43. The capacitive MEMS microphone 42 and the integrated circuit chip 43 are provided in the unit shell 41. The capacitive MEMS microphone 42 corresponds to an air inlet of the unit shell 41. The circuits in the capacitive MEMS microphone 42, the integrated circuit chip 43 and the unit shell 41 are connected through leads 44.

Figure 9:
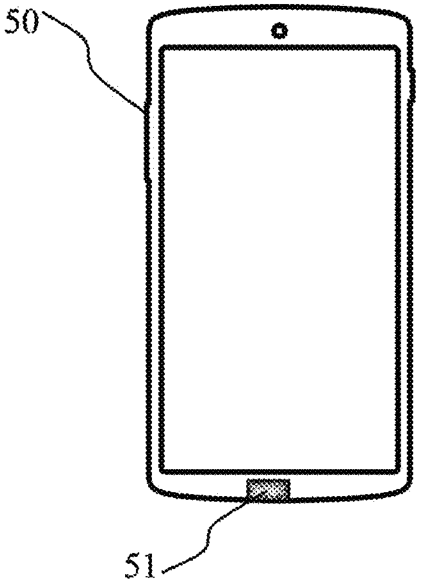
FIG. 9 shows a schematic diagram of an electronic device according to one embodiment disclosed herein.

FIG. 9 shows a schematic diagram of a microphone unit according to one embodiment disclosed herein.

As shown in FIG. 9, the electronic device 50 may include a microphone unit 51 shown in FIG. 8. The electronic device 50 may be mobile phones, tablets, monitoring devices, wearable devices, etc.

The above is only the specific implementation of the embodiment of the present disclosure. It should be noted that for those of ordinary skill in the art, several improvements and modifications can also be made without departing from the principles of the embodiments of the present disclosure, and these improvements and modifications should also be regarded as the protection scope of the embodiments of the present specification.

The invention claimed is:

1. A capacitive micro-electro-mechanical system (MEMS) microphone, comprising:
- a back electrode plate;
- a diaphragm; and
- a spacer separating the back electrode plate from the diaphragm,
- wherein in a state where an operating bias is applied, a ratio of a static effective displacement of the diaphragm relative to a flat position to a thickness of the diaphragm is greater than or equal to 0.5, and
- wherein the static effective displacement comprises an effective displacement of the diaphragm in a static state in which the operating bias is applied without a sound pressure.

2. The capacitive MEMS microphone of claim 1, wherein in the state where the operating bias is applied, the ratio of the static effective displacement of the diaphragm relative to the flat position to the thickness of the diaphragm is greater than or equal to 1.

3. The capacitive MEMS microphone of claim 1, wherein the spacer includes a first spacer disposed along periphery of the diaphragm, and a second spacer disposed within a projection range of the diaphragm toward the back electrode plate and separating the diaphragm into at least two vibrating portions.

4. The capacitive MEMS microphone of claim 3, wherein the second spacer is a columnar body located between the diaphragm and the back electrode plate.

5. The capacitive MEMS microphone of claim 4, wherein a sectional area of the columnar body at an end thereof in contact with the diaphragm is larger than that of the columnar body at the middle thereof.

6. The capacitive MEMS microphone of claim 4, wherein an end of the columnar body in contact with the diaphragm includes an elastic portion having elasticity greater than that of a main portion of the columnar body.

7. The capacitive MEMS microphone of claim 3, wherein the vibrating portions are used as diaphragm units to form a diaphragm array.

8. The capacitive MEMS microphone of claim 7, wherein at least two of the diaphragm units have different sound response characteristics.

9. A microphone unit, comprising a unit shell, the capacitive MEMS microphone of claim 1 and an integrated circuit chip, wherein the capacitive MEMS microphone and the integrated circuit chip are provided in the unit shell.

10. An electronic device, comprising the microphone unit of claim 9.

* * * * *